(12) United States Patent
Gatenholm et al.

(10) Patent No.: US 12,473,442 B2
(45) Date of Patent: *Nov. 18, 2025

(54) PREPARATION AND APPLICATIONS OF BIOCOMPATIBLE CONDUCTIVE 3D HYDROGELS BASED ON CELLULOSE NANOFIBRILS FOR DIAGNOSTICS AND INTERVENTION OF NEURODEGENERATIVE AND CARDIAC DISEASES

(71) Applicant: Ocean Tunicell AS, Blomsterdalen (NO)

(72) Inventors: Paul Gatenholm, Riner, VA (US); Erdem Karabulut, Oslo (NO)

(73) Assignee: Ocean Tunicell AS, Blomsterdalen (NO)

(*) Notice: Subject to any disclaimer, the term of this patent is extended or adjusted under 35 U.S.C. 154(b) by 885 days.

This patent is subject to a terminal disclaimer.

(21) Appl. No.: 17/020,345

(22) Filed: Sep. 14, 2020

(65) Prior Publication Data
US 2020/0407577 A1   Dec. 31, 2020

Related U.S. Application Data

(63) Continuation of application No. 15/963,076, filed on Apr. 25, 2018, now Pat. No. 10,774,227.
(Continued)

(51) Int. Cl.
*C09D 11/14* (2006.01)
*A61L 27/08* (2006.01)
(Continued)

(52) U.S. Cl.
CPC .............. *C09D 11/14* (2013.01); *A61L 27/08* (2013.01); *A61L 27/20* (2013.01); *A61L 27/36* (2013.01);
(Continued)

(58) Field of Classification Search
CPC . C09D 11/14; C09D 4/00; C09D 7/67; C09D 11/03; C09D 11/037; C09D 11/30;
(Continued)

(56) References Cited

U.S. PATENT DOCUMENTS

| 2013/0171439 A1 | 7/2013 | Shoseyov et al. |
| 2014/0058077 A1* | 2/2014 | Laukkanen .............. D21C 5/02 536/56 |
| 2016/0297104 A1* | 10/2016 | Guillemette ........... B33Y 30/00 |

OTHER PUBLICATIONS

Zheng et al. (ACS Appl. Mater. Interfaces 2015;7:3263-3271). (Year: 2015).
(Continued)

*Primary Examiner* — Kyung S Chang
(74) *Attorney, Agent, or Firm* — Woods Rogers Vandeventer Black PLC; Nathan A. Evans

(57) ABSTRACT

The present invention relates to preparation and use of biocompatible and electrically conductive 3D hydrogels comprising nanocellulose fibrils, such as disintegrated bacterial nanocellulose, plant derived nanocellulose, tunicate derived nanocellulose, or algae derived nanocellulose, together with carbon nanotubes or graphene oxide, as a biocompatible and conductive 3D hydrogel for diagnostics and intervention to mimic or restore tissue and organ function. Biocompatible conductive 3D hydrogels described in this invention can be extruded, casted or injected. The 3D hydrogels described in this invention are cohesive 3D structures and provide electrical conductivity in wet form. 3D hydrogels described in this invention can be further crosslinked using divalent ions such as Calcium ions which improve mechanical stability. Such crosslinking can take place in an animal or human body in a physiological environment after injection into the tissue. 3D hydrogels are biocompatible and show preferable mechanical properties and electrical conductivity through printed lines (4.10⁻¹ S
(Continued)

shows storage shear modulus of 3D hydrogel based on wood nanocellulose with and without carbon nanotubes after addition of 100 mmol Calcium Chloride (60 seconds).

cm$^{-1}$). The 3D hydrogels prepared by this invention are suited as bioassays to screen drugs against neurodegenerative diseases such as Alzheimer's and Parkinson's, study brain function, and/or be used to link the human brain with electronic and/or communication devices. They can also be injected to replace neural tissue or stimulate guiding of neural cells. They can also be used to inject into the heart and stimulate the heart by using electrical signaling or to repair myocardial infarction.

7 Claims, 2 Drawing Sheets

Related U.S. Application Data

(60) Provisional application No. 62/489,653, filed on Apr. 25, 2017.

(51) Int. Cl.

| | | |
|---|---|---|
| *A61L 27/20* | (2006.01) | |
| *A61L 27/36* | (2006.01) | |
| *A61L 27/38* | (2006.01) | |
| *A61L 27/44* | (2006.01) | |
| *A61L 27/50* | (2006.01) | |
| *A61N 1/05* | (2006.01) | |
| *A61N 1/36* | (2006.01) | |
| *A61N 1/362* | (2006.01) | |
| *B33Y 70/00* | (2020.01) | |
| *B33Y 80/00* | (2015.01) | |
| *B82Y 30/00* | (2011.01) | |
| *C09D 4/00* | (2006.01) | |
| *C09D 7/40* | (2018.01) | |
| *C09D 11/03* | (2014.01) | |
| *C09D 11/037* | (2014.01) | |
| *C09D 11/30* | (2014.01) | |
| *C09D 11/324* | (2014.01) | |
| *C09D 11/38* | (2014.01) | |
| *C09D 11/52* | (2014.01) | |
| *C12N 5/00* | (2006.01) | |
| *C12N 5/071* | (2010.01) | |
| *C12N 5/077* | (2010.01) | |
| *C12N 5/0793* | (2010.01) | |
| *C12N 5/09* | (2010.01) | |

(52) U.S. Cl.
CPC ......... *A61L 27/3625* (2013.01); *A61L 27/367* (2013.01); *A61L 27/3675* (2013.01); *A61L 27/3691* (2013.01); *A61L 27/38* (2013.01); *A61L 27/3826* (2013.01); *A61L 27/383* (2013.01); *A61L 27/3834* (2013.01); *A61L 27/3873* (2013.01); *A61L 27/3895* (2013.01); *A61L 27/443* (2013.01); *A61L 27/50* (2013.01); *A61N 1/0536* (2013.01); *A61N 1/3605* (2013.01); *A61N 1/36067* (2013.01); *A61N 1/36082* (2013.01); *A61N 1/362* (2013.01); *B33Y 70/00* (2014.12); *B33Y 80/00* (2014.12); *C09D 4/00* (2013.01); *C09D 7/67* (2018.01); *C09D 11/03* (2013.01); *C09D 11/037* (2013.01); *C09D 11/30* (2013.01); *C09D 11/324* (2013.01); *C09D 11/38* (2013.01); *C09D 11/52* (2013.01); *C12N 5/0062* (2013.01); *C12N 5/0619* (2013.01); *C12N 5/0657* (2013.01); *C12N 5/0691* (2013.01); *C12N 5/0693* (2013.01); *C12N 5/0697* (2013.01); *A61L 2300/412* (2013.01); *A61L 2300/64* (2013.01); *A61L 2400/12* (2013.01); *A61L 2430/20* (2013.01); *A61L 2430/32* (2013.01); *B82Y 30/00* (2013.01); *C12N 2501/90* (2013.01); *C12N 2501/999* (2013.01); *C12N 2513/00* (2013.01); *C12N 2533/78* (2013.01); *C12N 2539/00* (2013.01)

(58) Field of Classification Search
CPC ....... C09D 11/324; C09D 11/38; C09D 11/52; A61L 27/08; A61L 27/20; A61L 27/36; A61L 27/3625; A61L 27/367; A61L 27/3675; A61L 27/3691; A61L 27/38; A61L 27/3826; A61L 27/383; A61L 27/3834; A61L 27/3873; A61L 27/3895; A61L 27/443; A61L 27/50; A61L 2300/412; A61L 2300/64; A61L 2400/12; A61L 2430/20; A61L 2430/32; A61N 1/0536; A61N 1/3605; A61N 1/36067; A61N 1/36082; A61N 1/362; B33Y 70/00; B33Y 80/00; C12N 5/0062; C12N 5/0619; C12N 5/0657; C12N 5/0691; C12N 5/0693; C12N 5/0697; C12N 2501/90; C12N 2501/999; C12N 2513/00; C12N 2533/78; B82Y 30/00
See application file for complete search history.

(56) References Cited

OTHER PUBLICATIONS

Ougiya et al. (Biosci. Biotechnol. Biochem. 1998;62(9):1714-1719). (Year: 1998).
Zhao et al. (ACS Appl. Mater. Interfaces Mar. 28, 2017;9:13508-13519). (Year: 2017).
Hoeng et al. (RSC Adv. Mar. 7, 2017;7:15372-15381). (Year: 2017).
Related Case U.S. Appl. No. 16/608,714, Office Action dated Aug. 22, 2022.

* cited by examiner

FIGURE 1 shows storage shear modulus of 3D hydrogel based on wood nanocellulose with and without carbon nanotubes after addition of 100 mmol Calcium Chloride (60 seconds).
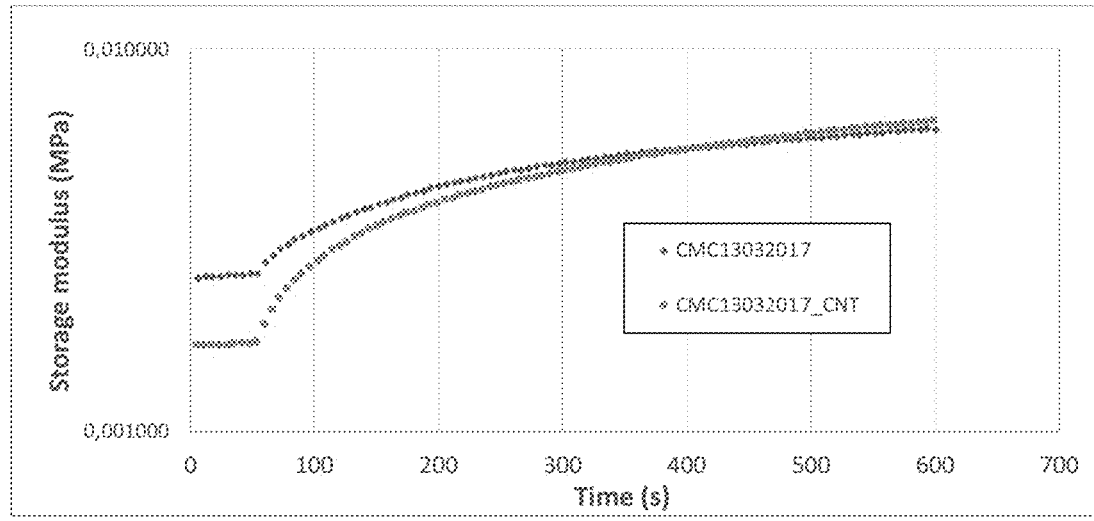
FIGURE 2 shows biocompatible and conductive 3D hydrogel extruded to measure conductivity.
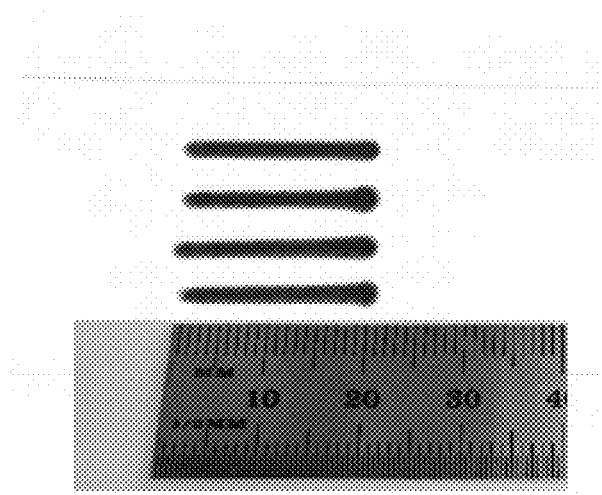

FIGURE 3 shows 3D hydrogel comprising carboxymethylated nanocellulose from wood and carbon nanotubes injected in 8% gelatin.
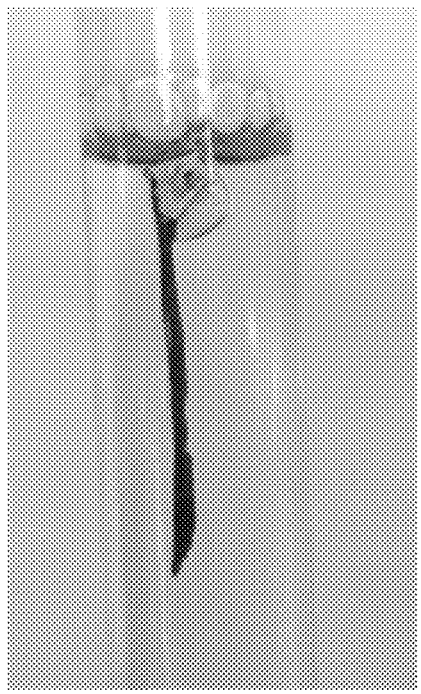
FIGURE 4 shows tracks of injected conductive 3D hydrogel comprising carboxymethylated nanocellulose derived from wood and carbon nanotubes in cadaveric heart of pig.
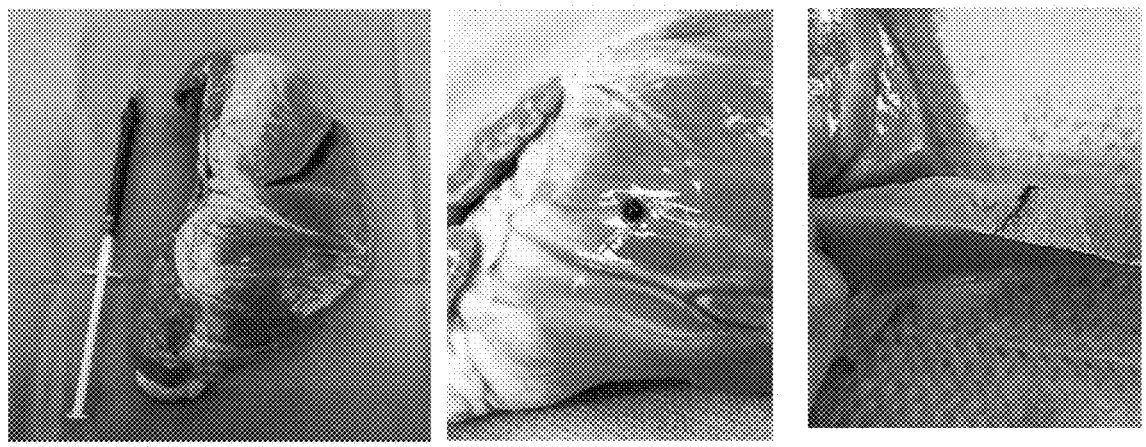

PREPARATION AND APPLICATIONS OF BIOCOMPATIBLE CONDUCTIVE 3D HYDROGELS BASED ON CELLULOSE NANOFIBRILS FOR DIAGNOSTICS AND INTERVENTION OF NEURODEGENERATIVE AND CARDIAC DISEASES

CROSS-REFERENCE TO RELATED APPLICATIONS

The present application is a continuation of and relies on the disclosures of and claims priority to and the benefit of the filing date of U.S. patent application Ser. No. 15/963,076 filed Apr. 25, 2018, which relies on the disclosures of and claims priority to and the benefit of the filing date of U.S. Provisional Application No. 62/489,653, filed Apr. 25, 2017. The disclosures of those applications are hereby incorporated by reference herein in their entireties.

BACKGROUND OF THE INVENTION

Field of the Invention

The present invention relates to nanocellulose- and carbon nanotubes- or other conductive materials such as graphene oxide, based biocompatible conductive 3D hydrogels. These 3D hydrogels are particularly suitable for extrusion, casting or injection of conductive patterns to provide attachment and guiding of neural cells and thus make it possible to create neural networks. Artificial neural networks can be used as a model of the brain to study neurodegenerative diseases such as Alzheimer's or Parkinson's disease. 3D hydrogels can also be used to restore neural networks and to connect the brain or neurons, as well as provide new connections with external devices, such as communication devices, smartphones, or computers.

Biocompatible conductive 3D hydrogels can be injected into an animal or human body and attract neural cells due to the electrical conductivity through the hydrogel. They will be thus acting as a guide to restore neural function, in aspects. When injected into a heart, they can be stimulated with an electrical field by connecting electrodes, for example, and can be used to restore myocardial function after heart infarct.

DESCRIPTION OF RELATED ART

Neurodegenerative disorders such as Alzheimer's and Parkinson's disease are among the most costly disorders globally with the total cost exceeding $800 billion USD in 2015. There are no effective treatments mainly due to lack of understanding of the detailed mechanisms of these diseases. Development of the model of a human brain using tissue engineering is a promising approach for future treatments. Access to biocompatible and electrically conductive biomaterials is crucial for developing brain model and treatment of neural disorders. Once scaffolds for neural network connections are developed there will be new applications for connecting brain and neural systems with electronic devices.

Different types of scaffolds have been investigated in the field of brain tissue engineering. Jonsson et al. [2] investigated scaffolding of nanocellulose to create a 3D neural structure. Two different surface treatments were tested. The results showed that cellulose cationized with trimethyl ammonium betahydroxy propyl promoted cell attachment and proliferation, and that coatings with extracellular matrix proteins, such as collagen, improved interactions between cells and between cells and the scaffold. Cellulose as a scaffold has also been studied by Kuzmenko et al. [3]. The aim was to create a scaffold that would suit neural networks and mimic the neural extracellular matrix by making the surface of the scaffolds electrically conductive either by multiwalled carbon nanotubes or carbonization into carbon nanofibers. The study shows how the surface modification of cellulose with conductive materials enhances cell attachment compared to non-treated cellulose.

It is challenging to culture neural cells since they are dependent on attachment on the surface in order to fully differentiate. They also depend on neighboring neural cells to be able to develop the neural network. Nanocellulose fibrils are a potentially attractive solution as biomaterials to resolve these challenges because they absorb the water on the surfaces and form a hydrogel in a native state. Nanocellulose can be isolated from tunicates which are marine animals. Nanocellulose fibrils are also a major component of plant tissue. They can be isolated by homogenization processes and such material is called Cellulose Nanofibrils (CNF). Cellulose can be also produced by bacteria and is then called Bacterial Nanocellulose (BNC). BNC has been successfully used as implants and scaffolds in tissue engineering. In vitro and in vivo studies have shown biocompatibility of BNC implants. They did not show foreign-body reaction, fibrosis, or capsule formation [4].

Carbon nanotubes, single-walled (CWNT) or multiwalled (MWNT), are emerging nanomaterials consisting of hollow graphitic cylinders of nanoscale dimensions with unique electrical and mechanical properties. They have been combined with different synthetic and natural polymers and evaluated as scaffolds for tissue engineering.

3D printing is an emerging technology which enables a user to fabricate materials using a bottom up approach. The related technology is 3D bioprinting in which liquid biomaterial and cells are dispensed in a pattern determined with a CAD file used to control motion of a 3D bioprinter. Scaffolds for neural networks can be prepared by using a 3D printer or 3D bioprinter. The result of the biofabrication process is very much dependent on inks. Inks have the crucial role of providing suitable rheological properties during the 3D printing process, which affect fidelity of the printed pattern and also in the later stages when the inks act as scaffolds during tissue development.

SUMMARY OF THE INVENTION

In embodiments, the present invention comprises a preparation of biocompatible conductive 3D hydrogel comprising nanocellulose, and preferably, in aspects, cellulose nanofibrils isolated from tunicates, plants, or algae, optionally with the addition of conductive components such as carbon nanotubes or graphene oxide. In aspects, the resulting hydrogel may be used for injection into tissue and creating electrically conductive patterns. Conductive 3D hydrogels, after extrusion or injection, provide attachment sites and guidance for neural cells, for example, and can thus control formation of neural networks. In aspects, biocompatible nanocellulose is used as a component of the 3D hydrogel, which is an electrical isolator. The nanocellulose fibrils are capable of producing a 3D network in the hydrogel, which provides viscosity and shear thinning properties. Cellulose nanofibrils also can provide a relatively large surface area (e.g., up to several hundred sqm). In other aspects, the electrical conductivity of the 3D hydrogel is provided by addition of carbon nanotubes or graphene oxide. The dispersion through mixing together with tailor-made surface properties of both components results in a homogeneous hydrogel with electrical conductivity and preferable flow properties and mechanical properties after injection. In embodiments, such a biocompatible conductive 3D hydrogel can be injected in the heart to stimulate cells to repair the heart, or to use to send or facilitate electrical signals for controlling heart beating, functionality, or viability. In other embodiments, such 3D hydrogels when injected can also be used for guides for neural tissue repair.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 1 shows storage shear modulus of 3D hydrogel based on wood nanocellulose with and without carbon nanotubes after addition of 100 mmol Calcium Chloride (60 seconds).

FIG. 2 shows a biocompatible and conductive 3D hydrogel extruded to measure conductivity.

FIG. 3 shows 3D hydrogel comprising carboxymethylated nanocellulose from wood and carbon nanotubes injected in 8% gelatin.

FIG. 4 shows tracks of injected conductive 3D hydrogel comprising carboxymethylated nanocellulose derived from wood and carbon nanotubes in a cadaveric heart of pig.

DETAILED DESCRIPTION OF VARIOUS EMBODIMENTS OF THE INVENTION

To facilitate a better understanding of the present invention, the following examples of certain aspects of some embodiments are given. In no way should the following examples be read to limit, or define, the scope of the invention.

Example 1

Preparation of Biocompatible Conductive 3D Hydrogels.

Aqueous SWCNT dispersion (1 wt. %, 10 mL, Carbon Solutions, Inc., purified with nitric acid P3-SWNT, bundle diameter 4-5 nm, 1.0-3.0 at. % COOW) was added and homogenized at 8000 rpm with UltraTurrax mixer (IKA, T25basic, S25N 8G) for 10 min. A carbon nanotubes (CNT) dispersion was created by mixing 100 mg of CNT powder in 10 ml of pluronic solution (0.1 wt %). The mixture was placed in a sonicator and heated to 70° C. for 8 hours. The resulting CNT dispersion was mixed with nanocellulose dispersion at a 1:1 volume to mass ratio, e.g. 4 g of nanocellulose dispersion was mixed with 4 ml of CNT dispersion. The mixture was speed mixed (using Speed-Mixer™) at 2000 rpm for 2×2 minutes. This resulted in a smooth homogeneous hydrogel.

Example 2

Crosslinking of Biocompatible Conductive 3D Hydrogels.

Flow properties and mechanical properties of 3D hydrogels were investigated with Rheometer Discovery HR-2 from TA Instruments. Both 3D nanocellulose hydrogels and 3D nanocellulose with carbon nanotubes hydrogels were shear thinning, which is favorable when it comes to applying by extrusion or by injection. They had high viscosity at low shear rate and decreasing viscosity when increasing shear rate. Oscillation-time measurements were conducted on carboxymethylated nanocellulose with and without carbon nanotubes at 1.5% strain and a frequency of 1 Hz for 10 min using a Discovery HR-2 rheometer (TA Instruments, Crawley, UK). All measurements were conducted at 25° C., with a plate-plate geometry of 20 mm (gap: 500 µm). At 60 seconds after initiating the measurement, 1 ml of 0.1 M CaCl2 was dispensed around the sample while gathering data on the storage and loss moduli. FIG. 1 shows storage shear modulus of 3D hydrogel based on wood nanocellulose with and without carbon nanotubes after addition of 100 mmol Calcium Chloride (60 seconds). Both samples show increased modulus after addition of Calcium Chloride which means that they can be crosslinked using Calcium ions.

Example 3

Evaluation of Electrical Conductivity.

FIG. 2 shows biocompatible and conductive 3D hydrogel based on carboxymethylated nanocellulose and carbon nanotubes extruded onto a glass slide to measure conductivity. The shape and size of the lines were reproducible, and the hydrogels were very homogenous. Conductivity measurements were performed along the 3D extruded lines using a 4-point probe system (22° C., Parameter Analyzer-Keithley 4200-SCS). At least 5 different spots were tested. The electrical conductivity was 2.10'S/cm, and increased in the wet state.

Example 4

Injecting 3D Hydrogels into Tissue and Organs.

In order to evaluate injectability of the 3D nanocellulose hydrogel with carbon nanotubes, the 3D hydrogel was injected into 8% gelatin solution which was allowed to solidify overnight. FIG. 3 shows 3D hydrogel comprising carboxymethylated nanocellulose from wood and carbon nanotubes injected into 8% gelatin. The line has favorable shape stability during injection. It is not diffusing into surrounding gelatin. A pig heart was used to demonstrate injection of the 3D hydrogels into cardiac tissue. The same mixture of nanocellulose with carbon nanotubes was placed in syringes. The hydrogels were injected into the heart using a 22 G syringe needle (0.7 mm×25 mm). The needle was placed as far into the tissue as possible and pressure was applied to the syringe while slowly moving the whole syringe upwards. The tissue was left for 10 minutes and then cut using a microtome blade to visually be able to analyze the injected hydrogel. FIG. 4 shows tracks of injected conductive 3D hydrogel comprising carboxymethylated nanocellulose derived from wood and carbon nanotubes in a cadaveric heart of pig. It was relatively easy and not difficult or problematic to inject 3D hydrogel and the lines kept their shape without significant signs of diffusion into surrounding tissue.

Homogenization of BNC a) Hydrolysis was carried out by treating 100 g of BNC gel (1 g cellulose) with 19 wt. % sulfuric acid at 60° C. for 48h, after which the reaction system was cooled and neutralized with 1 M NaOH. The sample was then washed thoroughly with de-ionized water and centrifuged at 4000 rpm for 15 minutes at least 5 times. The obtained gel was then re-suspended in 300 ml pyrogen-free water (HyClone cell culture-grade water, Thermo Fisher Scientific) and treated with an UltraTurrax (IKA) at 20,000 rpm for 10 minutes. The obtained colloidal dispersion was then centrifuged at the same conditions as above. The gel was further concentrated to 5 wt. % by means of ultrafiltration with a UF unit (Waters) and a PTFE membrane of 1000 MWCO.

b) Mechanical homogenization: BNC pellicles were cut into small pieces, disintegrated in a lab blender and homogenized at 20,000 rpm (0.4 wt. % concentration) with an UltraTurrax (IKA) at 20,000 rpm for 5 minutes, and then submitted to ACC treatment (using ACC system Sugino, Japan) at 200 MPa of ejecting pressure 30 times (pass).

Conductive Inks Preparation

Bacterial Nanocellulose (BNC) aqueous dispersion (2.4 wt. %) was diluted in water for better homogenization. Aqueous SWCNT dispersion (1 wt. %, 10 mL, Carbon Solutions, Inc., purified with nitric acid P3-SWNT, bundle diameter ~4-5 nm, 1.0-3.0 at. % COOH) was added and homogenized at 8,000 rpm with UltraTurrax mixer (IKA, T25basic, S25N 8G) for 10 minutes. The resulting mixture had BNC/CNT dry weight ratio of 80/20 and the concentration of 0.2 wt. %. 1 M NaOH wad added until the pH of the dispersion reached from pH 6.5 to pH 8.5 to gain a better miscibility between two components. The mixture was homogenized again with UltraTurrax mixer for 10 minutes at 8,000 rpm. Yet the mixture was too diluted for printing. Therefore, it was dehydrated by two consecutive steps: 1) centrifugation at 4,000 rpm with a subsequent removal of a clear supernatant; 2) air-drying for 3 days. Final concentration of printable inks was 2 wt. %. For comparative analysis, the inks made of the pure 2 wt. % BNC were also prepared.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

REFERENCES NOTED ABOVE AND/OR INCORPORATED HEREIN BY REFERENCE

1. M. Prince, A. Wimo, M. Guerchet, G.-C. Ali, Y.-T. Wu, M. Prina, *World Alzheimer Report* 2015. *The Global Impact of Dementia*, Alzheimer's Disease International (ADI), London, 2015.
2. Jonsson M, Brackman C, Puchades M, Brattås K, Ewing A, Gatenholm P, et al. Neuronal Networks on Nanocellulose Scaffolds. TISSUE ENGINEERING: Part C. 2015 September; 21(11):1162-1170.
3. Kuzmenko V, Kalogeropoulos T, Thunberg J, Johannesson S, Hägg D, Enoksson P, et al. Enhanced growth of neural networks on conductive cellulose-derived nanofibrous scaffolds. Materials Science and Engineering C. 2015, 58:14-23.
4. G. Helenius, H. Bäckdahl, A. Bodin, U. Nannmark, P. Gatenholm, B. Risberg, In vivo biocompatibility of bacterial cellulose, J. Biomed. Mater. Res. A76 (2006) 431-438.
5. Matsuoka M, Tsuchida T, Matsushita K, Adachi O, Yoshinaga F. A synthetic medium for bacterial cellulose production by *Acetobacter xylinum* subsp *sucrofermentans*. Biosci Biotech Biochem 1996; 60:575-579.
6. M. Innala, I. Riebe, V. Kuzmenko, J. Sundberg, P. Gatenholm, E. Hanse, S. Johannesson, 3D Culturing and Differentiation of SH-SY5Y Neuroblastoma Cells on Bacterial Nanocellulose Scaffolds, *Artif. Cells, Nanomed., Biotechnol.* 2014, 42, 302-308.

The invention described herein includes several Aspects, those aspect including but not limited to the following:

Aspect 1: A biocompatible and electrically conductive three-dimensional (3D) hydrogel comprising nanocellulose, wherein the nanocellulose comprises one or more of hydrolyzed bacterial cellulose, cellulose nanofibrils, cellulose nanocrystals, disintegrated bacterial cellulose, nanocellulose isolated from tunicates, and/or nanocellulose isolated from plants or algae, wherein the 3D hydrogel further comprises carbon nanotubes, graphene oxide, or both, and wherein the 3D hydrogel is capable of restoring biological function of tissue, organs, or combinations thereof.

Aspect 2: The biocompatible and electrically conductive 3D hydrogel of Aspect 1, wherein the 3D hydrogel is capable of being injected into an animal or human to restore biological or chemical function of tissue, organs, or combinations thereof.

Aspect 3: The biocompatible and electrically conductive 3D hydrogel of Aspect 1, wherein the 3D hydrogel is capable of being used for culturing neural cells, wherein the neural cells are capable of forming neural networks.

Aspect 4: The biocompatible and electrically conductive 3D hydrogel of Aspect 1, wherein the 3D hydrogel is capable of being used for differentiation of stem cells.

Aspect 5: The biocompatible and electrically conductive 3D hydrogel of Aspect 1, wherein the 3D hydrogel is capable of being used for drug discovery or testing treatments.

Aspect 6: The biocompatible and electrically conductive 3D hydrogel of Aspect 1, wherein the 3D hydrogel is capable of being used as a neurodegenerative disease model.

Aspect 7: The biocompatible and electrically conductive 3D hydrogel of Aspect 1, wherein the 3D hydrogel is capable of being used for culturing induced pluripotent stem cells, mesenchymal stem cells, neuroprogenitor cells, and/or neural cells, and wherein the induced pluripotent stem cells, mesenchymal stem cells, neuroprogenitor cells, and/or neural cells are capable of forming neural networks.

Aspect 8: The biocompatible and electrically conductive 3D hydrogel of Aspect 1, wherein the 3D hydrogel is capable of guiding neural cells to restore neural functions.

Aspect 9: The biocompatible and electrically conductive 3D hydrogel of Aspect 1, wherein the 3D hydrogel is capable of being injected into cardiac tissue to restore function of the cardiac tissue or a heart.

Aspect 10: The biocompatible and electrically conductive 3D hydrogel of Aspect 1, wherein the 3D hydrogel is capable of treating animals or humans by replacing brain, heart, and/or neural tissue, by injecting the 3D hydrogel into or around brain, heart, and/or neural tissue, or combinations thereof.

Aspect 11: The biocompatible and electrically conductive 3D hydrogel of Aspect 1, wherein the 3D hydrogel is capable of treating animal or human organs by providing or sending electrical impulses or stimulation to the 3D hydrogel.

Aspect 12: The biocompatible and electrically conductive 3D hydrogel of Aspect 1, wherein the 3D hydrogel is capable of treating animal or human organs by injecting the 3D hydrogel into or onto the heart and/or heart tissue and by stimulating heart cells to grow and repair and/or treat myocardial infarction, damage caused by myocardial infarction, and/or other heart pathology.

Aspect 13: The biocompatible and electrically conductive 3D hydrogel of Aspect 1, wherein all or some of the nanocellulose is negatively charged.

Aspect 14: The biocompatible and electrically conductive 3D hydrogel of Aspect 13, wherein the nanocellulose is negatively charged by TEMPO oxidation, periodate oxidation followed by reduction, carboxymethylation, or combinations thereof.

Aspect 15: The biocompatible and electrically conductive 3D hydrogel of Aspect 1, wherein sodium or other salt of carboxymethylcellulose (CMC) is added to the nanocellulose.

Aspect 16: The biocompatible and electrically conductive 3D hydrogel of Aspect 1, wherein the carbon nanotubes are negatively charged.

Aspect 17: The biocompatible and electrically conductive 3D hydrogel of Aspect 1, wherein the graphene oxide is negatively charged.

Aspect 18: The biocompatible and electrically conductive 3D hydrogel of Aspect 1, wherein the 3D hydrogel is produced using a mixing technique.

The invention claimed is:

1. A biocompatible and electrically conductive three-dimensional (3D) hydrogel comprising nanocellulose, wherein the 3D hydrogel in its final form for bioprinting or injecting into tissue is non-dried, wherein the nanocellulose comprises one or more of bacterial cellulose, cellulose nanofibrils, cellulose nanocrystals, or disintegrated bacterial cellulose, wherein the nanocellulose is isolated from tunicates, bacteria, plants, and/or algae, wherein the non-dried 3D hydrogel further comprises graphitic-based electrically conductive nanomaterials, and wherein the non-dried 3D hydrogel in its final form is bioprinted to form three-dimensionally bioprinted structures or injected into tissue.

2. The biocompatible and electrically conductive 3D hydrogel of claim 1, wherein all or some of the nanocellulose is negatively charged.

3. The biocompatible and electrically conductive 3D hydrogel of claim 2, wherein the nanocellulose is negatively charged by TEMPO (2,2,6,6-tetramethylpiperidine-1-oxyl radical) oxidation, periodate oxidation followed by reduction, carboxymethylation, or combinations thereof.

4. The biocompatible and electrically conductive 3D hydrogel of claim 1, wherein sodium potassium or quaternary ammonium salts of carboxymethylcellulose (CMC) is added to the nanocellulose.

5. The biocompatible and electrically conductive 3D hydrogel of claim 1, wherein the graphitic-based electrically conductive nanomaterials are negatively charged.

6. The biocompatible and electrically conductive 3D hydrogel of claim 1, wherein the graphitic-based electrically conductive nanomaterials include one or more carbon nanotubes, graphene oxide, or both.

7. The biocompatible and electrically conductive 3D hydrogel of claim 6, wherein the one or more carbon nanotubes, the graphene oxide, or both, are negatively charged.

* * * * *